United States Patent [19]
Zutrauen et al.

[11] 3,956,693
[45] May 11, 1976

[54] METHOD AND APPARATUS FOR TESTING MAGNETIC SENSORS USING A SATURABLE CORE AND VARIABLE LOAD RESISTORS TO SIMULATE ACTUAL TEST CONDITIONS

[75] Inventors: Stephen W. Zutrauen, Weston; Peter P. Stauskas, Toronto, both of Canada

[73] Assignee: The Garrett Corporation, Los Angeles, Calif.

[22] Filed: Dec. 23, 1974

[21] Appl. No.: 535,917

[52] U.S. Cl. ............................................ 324/34 R
[51] Int. Cl.² ........................................ G01R 35/00
[58] Field of Search ............ 324/34 R, 34 D, 34 PS, 324/41, 40

[56] References Cited
UNITED STATES PATENTS
3,408,493  10/1968  Westover et al. ..................... 324/41

FOREIGN PATENTS OR APPLICATIONS
226,922  9/1958  Australia ............................. 324/40

OTHER PUBLICATIONS

Flaw Simulator for Probe Calibration, Inst. Tech., Vol. 18, No. 4, Apr. 1971, p. 62.

*Primary Examiner*—Robert J. Corcoran
*Attorney, Agent, or Firm*—Joel D. Talcott; Albert J. Miller

[57] ABSTRACT

A method and apparatus for electronically testing magnetic sensors such as monopoles, proximity switches and other magnetic pickups by placing a magnetizable core adjacent the sensor and energizing the core to periodically saturate it. This periodic saturation will change the reluctance adjacent the sensor and thereby simulate conditions under which the sensor is to be used. Both A.C and D.C. energization of the core is employed. The output circuit of the sensor is equiped with variable resistors whereby the equivalent load conditions of the sensor may also be simulated.

6 Claims, 6 Drawing Figures

METHOD AND APPARATUS FOR TESTING MAGNETIC SENSORS USING A SATURABLE CORE AND VARIABLE LOAD RESISTORS TO SIMULATE ACTUAL TEST CONDITIONS

BACKGROUND OF THE INVENTION

Magnetic sensors, such as monopoles, are used extensively to sense the rotating speed of a turbine shaft or other turbomachinery components. Monopoles operate on the principle that the magnetic field generated by a permanent magnet located in the monopole is attracted by any ferromagnetic object moving near the pole piece. Shifting magnetic lines cut across the monopole coil inducing an output voltage proportional to the speed of the moving object (rate of change of flux lines). These monopoles make use of what is known as "stray magnetic field" and no provision for a "return magnetic circuit" is required.

Shaft revolutions per minute (RPM) can easily be determined by sensing the moving teeth of a gear mounted on the shaft according to the following formula:

$$\text{Shaft RPM} = \frac{60F}{N}$$

where $F$ is the frequency of the monopole generated signal in Hertz, and $N$ is the number of teeth on the gear.

The conventional methods of testing magnetic sensors such as monopoles is by checking their output voltage under conditions similar to those encountered during actual operation. This requires set-ups using various gears, expensive high speed motor drives, and time-consuming air-gap and speed adjustments.

Since each type of monopole requires a different set-up, testing with gears is quite expensive; because of the individual mounting of each monopole and the adjustments required, the testing is also time-consuming. The difficulty in adjusting the air-gap between the gears and the monopole and in controlling motor speed, together with the problem of voltage modulation due to eccentricity of the gear and motor shaft, result in a substantial increase in the errors that can be introduced into the output voltage readings. In addition, the output voltage waveform is dependent upon the shape of the gear teeth and the length of the air gap. A safety hazard is also presented by the high speed rotating parts.

SUMMARY OF THE INVENTION

The present invention is directed toward the testing of magnetic sensors with an electronic reluctance generator or "reluctor" comprising an AC, or AC and DC, excited saturable magnetic core. Using the reluctor to vary the reluctance of the magnetic path in front of the magnetic sensor, the output voltage of the magnetic sensor can be tested without the use of spinning gears or other moving parts.

DETAILED DESCRIPTION OF THE PREFERRED EMBODIMENTS

While the present invention is directed generally to the testing of any magnetic sensor, the invention will be described in detail, for purposes of illustration only, with respect to a magnetic speed sensor, commonly referred to as a monopole. It should be recognized, however, that the invention is equally applicable to sensors such as proximity switches and other magnetic pickups.

Figure 1:
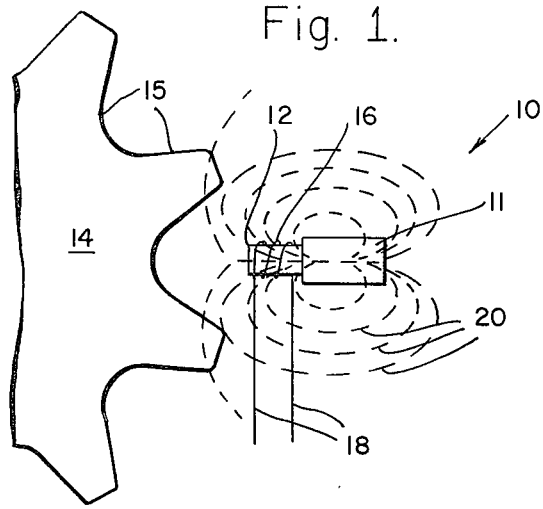
FIGS. 1 and 2 are schematic illustrations of the principle of monopole operation with a rotating gear.
Figure 2:
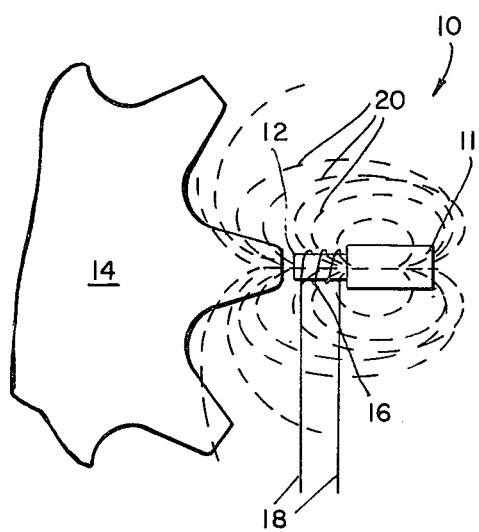

The principle of operation of a monopole, which is a magnetic sensor commonly used to determine rotational speed, is illustrated graphically in FIGS. 1 and 2. The monopole 10, generally comprising a permanent magnet 11 having a pole piece 12 extending therefrom, is disposed in proximity to a rotating gear 14 having a plurality of teeth 15 of a ferromagnetic material. Disposed around the pole piece 12 is a coil 16 having a pair of leads 18 extending therefrom. Leakage flux, generally indicated by dotted lines 20, extends outward from the permanent magnet 11.

When the pole piece 12 is between gear teeth 15 as illustrated in FIG. 1, most of the leakage flux lines are unaffected by the presence of the ferromagnetic gear teeth 15. Only a few of these flux lines are attracted by the teeth 15 and thus only a low voltage is induced in the monopole coil 16.

When, however, a gear tooth 15 is rotated to a position directly opposite the monopole pole piece 12, more flux lines move toward the gear tooth following the lower reluctance path. Thus a higher voltage is induced in the monopole coil 16 as the moving flux lines cut through the coil 16. As the gear rotates, the monopole 16 alternately produces high and low voltages as the gear teeth pass in front of the pole piece 12. As previously indicated, the frequency ($F$) of this voltage fluctuation can be measured and used to determine the rate of rotation of the gear, if the number of teeth in the gear ($N$) is known, by the formula $$\text{Shaft RPM} = \frac{60F}{N}$$

Figure 3:
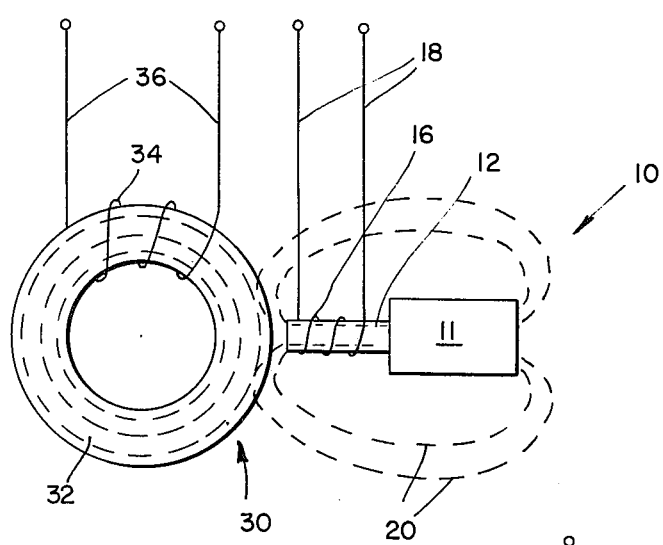
FIGS. 3 and 4 are schematic illustrations of the magnetic sensor testing apparatus and method of the present invention.
Figure 4:
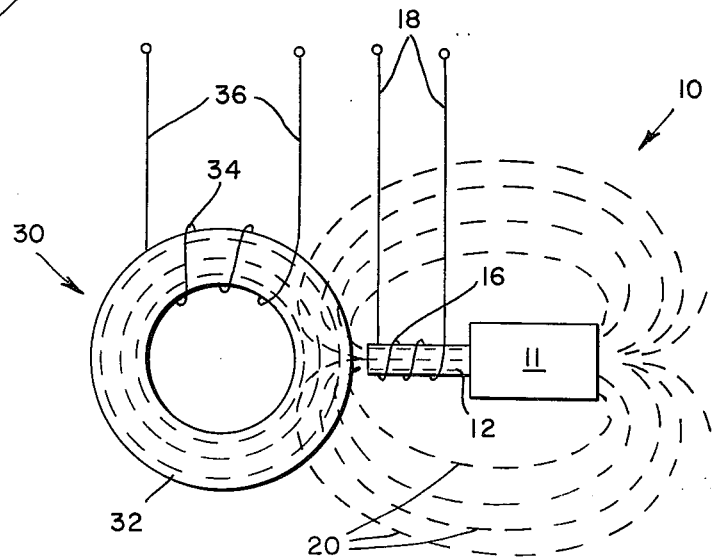

The same effect as the rotating gear 14 of FIGS. 1 and 2 can be produced electronically by an electronic reluctance generator or "reluctor." As illustrated in FIGS. 3 and 4, the variable reluctance device 30 is disposed adjacent the monopole 10 including permanent magnet 11 having pole piece 12 extending therefrom. The reluctor 30 may comprise a high permeability toroidal iron core 32 driven to various levels of saturation by means of an AC excitation coil 34. The high permeability toroidal core is used to minimize the magnetizing force required to reduce magnetic leakage. The excitation coil 34 receives AC power through leads 36.

The flux and, therefore, the permeability of the toroidal iron core 32 is varied by driving the core to various levels of saturation using the AC excitation coil 34. The voltage induced in the monopole coil 16 is due to the changed magnetic field 20 produced by varying core permeability. By exciting the core sufficiently to drive the core over the knee of the B-H curve, a sudden change in permeability will result which, in turn, will produce a sudden change in monopole output voltage waveform. This, however, would not satisfactorily duplicate the effect on the monopole which is induced during actual operation. Accordingly, the excitation coil in initially energized by a DC voltage which drives the core to a region wherein permeability changes smoothly with flux density. Then an AC voltage is applied to produce smooth changes in permeability so that the voltage induced in the monopole coil 16 substantially duplicates that found under actual operating conditions and the monopole functions in the same manner as if a plurality of gear teeth were passing thereby in the manner illustrated in FIGS. 1 and 2. FIG. 3 is illustrative of high AC excitation producing low iron core permeability with a resultant low monopole output signal similar to the situation of FIG. 1 while FIG. 4 is illustrative of low AC excitation producing high iron core permeability with a resultant high monopole output signal such as occurred in FIG. 2.

Figure 5:
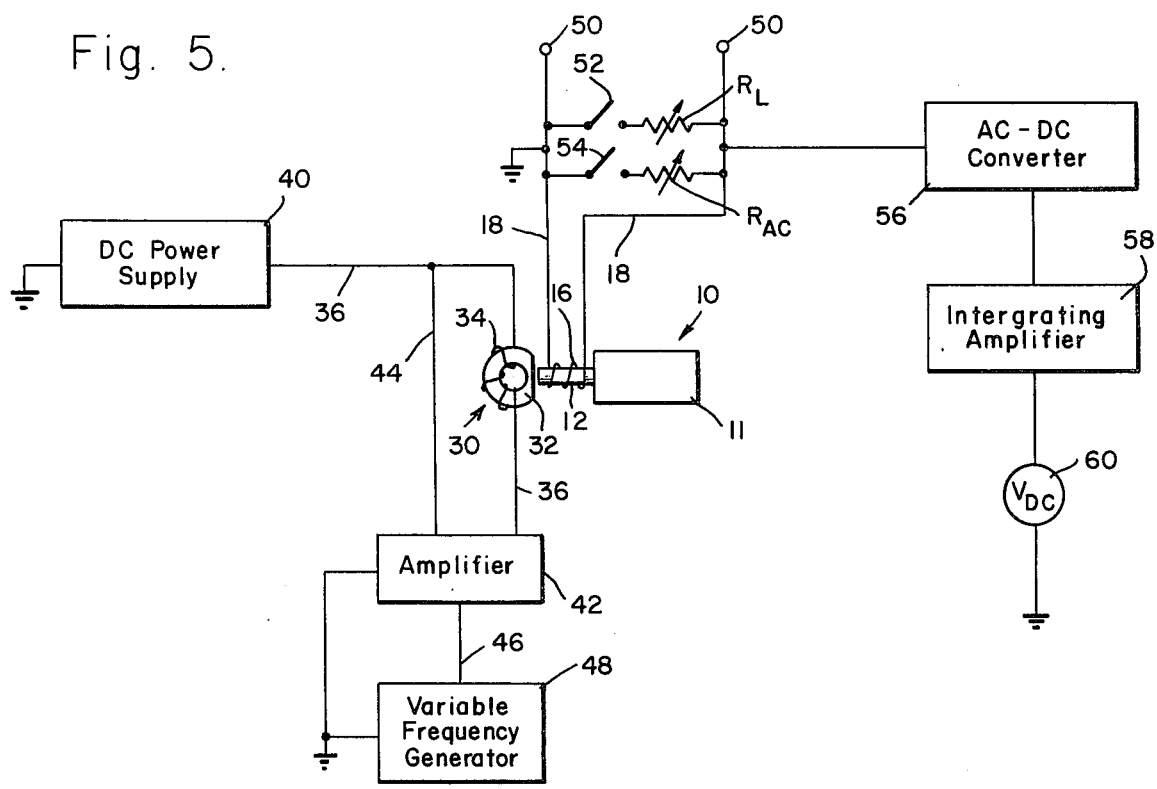
FIG. 5 is a schematic electrical diagram for the monopole magnetic sensor testing apparatus and method of FIGS. 3 and 4.

An electrical schematic for the testing apparatus and method of FIGS. 3 and 4 is illustrated in FIG. 5. The toroidal iron core 32 of the reluctor 30 has its excitation coil 34 connected by the leads 36 between a DC power supply 40 and an amplifier 42. The amplifier 42 is also connected by a lead 44 to one of the leads 36 at a point between the excitation coil 34 and the DC power supply 40. A lead 46 connects the amplifier 42 to a variable frequency generator 48. Each of the DC power supply 40, amplifier 42 and variable frequency generator 48 is also connected to a system common or ground.

The leads 18 from the monopole coil 16 around the pole piece 12 of the monopole 10 are connected to a pair of terminals 50 to which an oscilloscope (not shown) may be connected for visual examination of the alternating voltage induced in the monopole coil 16.

Connected in parallel between the leads 18 are a serially connected switch 52 and variable resistor $R_L$ and serially connected switch 54 and variable resistor $R_{AC}$. Prior to testing, $R_L$ can be adjusted to a desired value and connected across the monopole coil 16 to represent monopole load resistance; $R_{AC}$ can be adjusted and connected across the monopole coil 16 to represent the equivalent eddy current loss resistance which would be generated by a rotating gear.

One of the leads 18 is connected to ground and the other lead 18 is connected to an AC-to-DC converter 56 which is in turn connected to an integrating amplifier 58. The integrating amplifier 58 is connected through a DC voltmeter 60 to ground.

It will be readily understood that the monopole output tester of this invention will be used with various monopoles, each of which may be used with different types of gears requiring different load resistances. Further, each type of monopole might be used with various air gaps between the monopole and the gear. Accordingly, the monopole output tester of this invention is adjustable to compensate for these variables and permit accurate testing under conditions substantially duplicating all situations in which the monopole might actually be used.

By selectively adjusting and connecting resistors $R_L$ and $R_{AC}$ across the monopole coil 16, monopole load resistance and equivalent eddy current loss resistance can be properly set. By then setting the voltage provided by the DC power supply 40 and the voltage and frequency of the signal produced by the variable frequency generator 48 through the amplifier 42, the tester will give accurate and reproducible readings showing the ability of a particular monopole to function under any or all sets of operating conditions.

With circuit adjustments properly made and the pole piece 12 of the monopole 10 placed against the core 32 of the reluctor 30, testing may be begun. As previously indicated, the excitation of the toroidal iron core 32 by a DC component as well as an AC component produces a sinusoidal output waveform which is similar to the actual waveforms obtained in most monopole applications.

Figure 6:
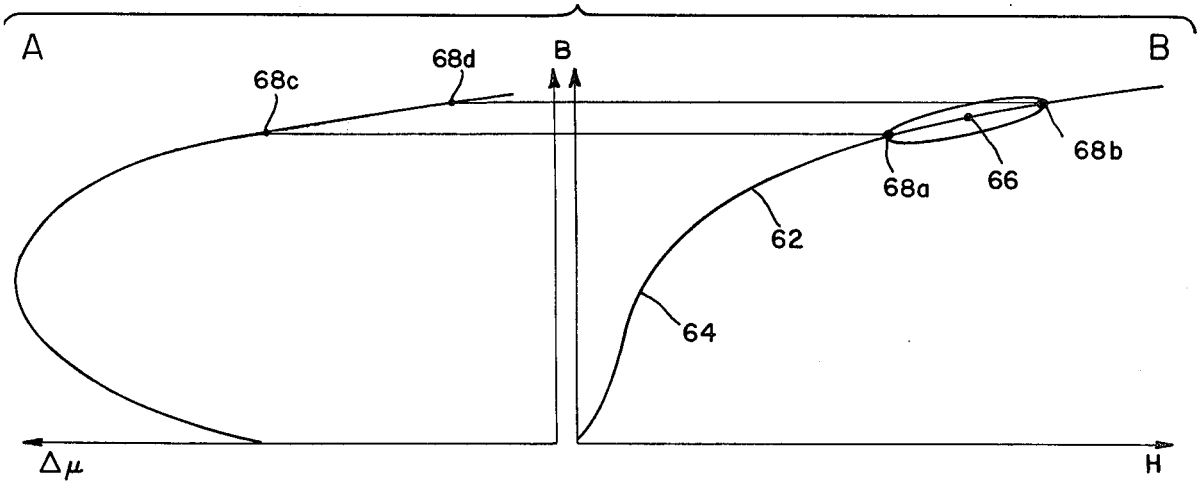
FIG. 6 is a pair of graphs, labeled 6A and 6B which illustrate the operation of the sensor testing apparatus of this invention.

FIG. 6 illustrates the magnetic effects which result from this combination. FIG. 6B is a graph of flux density on the vertical axis versus magnetization on the horizontal axis illustrating a typical B-H curve 62 for the toroidal core 32. FIG. 6A is a corresponding graph plotting flux density on the vertical axis versus increment permeability on the horizontal axis.

When the excitation coil 34 of the reluctor 30 is energized by a direct current voltage from the DC power supply 40, the magnetization and corresponding flux density of the toroidal iron core 32 are brought into a region of the B-H curve beyond the "knee" 64 of the B-H curve 62. For purposes of example, it will be assumed that the direct current voltage excites the core 32 to a level corresponding to the point 66 on the B-H curve. In this region, as can be seen by comparison of FIGS. 6A and 6B, permeability of the toroidal core 32 changes very slowly and smoothly with corresponding changes in flux density.

In addition to the direct current voltage from the power supply 40, the excitation coil 34 is also energized by a sinusoidal voltage waveform produced by the variable frequency generator 48 and amplified by the amplifier 42. The amplifier 42 is generally required because most commercially available variable frequency generators are not capable of producing sufficient excitation power for the necessary flux changes in the iron core 32. When applied to the excitation coil 34, the AC voltage causes fluctuations in magnetization and flux density in the core 32. These fluctuations are between points on the B-H curve which are substantially equidistant from and located on either side of the point 66. One pair of such points 68a and 68b are shown on the curve in FIG. 6A. Corresponding to these variations in flux density are changes in the permeability of the core 32 which would follow the permeability curve shown in FIG. 6B and would in this case fluctuate between points 68c and 68d on the curve.

Because of the initial adjustment of the circuit parameters, this change in permeability of the core substantially duplicates test conditions which could be provided in testing the monopole with a rotating gear. The resulting voltage generated in the monopole coil 16 is carried through the leads 18. The voltage is affected by the load resistance $R_L$ and the equivalent eddy current loss resistance $R_{AC}$ and is then applied to the AC-to-DC converter 56 which amplifies the signal and changes the alternating voltage in a well known manner. The signal is then further amplified by the integrating amplifier 58, which may be an operational amplifier. The DC voltmeter 60 registers the magnitude of this voltage.

The test set is capable of checking all monopoles by simulating various combinations of gear sizes, air-gaps and frequencies. Actual monopole output for these combinations can vary anywhere from a fraction of a volt to 100 volts.

To avoid the high power AC and DC core excitation which would be necessary to produce a high output voltage, reduced core excitation may be used, producing only a fraction of the actual output voltage. This signal is then applied to the AC-to-DC converter 56 and integrating amplifier 58 which has the DC voltmeter 60 connected across its output. The gain of the two OP AMP converter stages 56 and 58 can be set such that the DC voltmeter readings are equal to a multiple of the peak-to-peak monopole signal amplitude which corresponds to the peak-to-peak amplitude obtained using the conventional gear-monopole combination.

While the waveforms obtained by monopole testing with gears depends upon the shape of the gear and the air-gap, the electronic monopole test apparatus produces an output which is almost always perfectly sinusoidal. The electronic test apparatus does not require mounting or air-gap adjustment. Rotating parts are entirely eliminated. Accordingly, the electronic testing is fast, accurate, inexpensive, and safe.

While specific embodiments of the invention have been illustrated and described, it is to be understood that these are provided by way of example only and that the invention is not to be limited thereto but only by the proper scope of the following claims:

We claim:
1. Apparatus for electrically simulating a mechanical stimulus for causing the production of an electrical response by a magnetic sensor and evaluating the response, said apparatus comprising:
   a magnetizable core having an excitation coil;
   means for mounting a magnetic sensor adjacent to the magnetizable core;
   means for applying a fluctuating voltage to the excitation coil for producing changes in the permeability of the core substantially duplicating the changes produced by a mechanical stimulus; and
   evaluation means electrically connected to the magnetic sensor for measuring the voltage from the magnetic sensor, said response evaluation means includes resistance means electrically connected to the output leads of said sensor for applying equivalent load and eddy current loss resistance to those of the mechanical stimulus being simulated.

2. Apparatus as in claim 1 wherein said response evaluation means includes an oscilloscope.

3. Apparatus as in claim 1 wherein said means for applying a fluctuating voltage comprises D.C. voltage source means connected to said excitation coil for magnetizing the core such that changes in flux density will produce slow and smooth changes in core permeability, and A.C. voltage source means connected to said excitation coil for producing changes in the permeability of the core.

4. Apparatus for evaluating the response of a magnetic sensor to the successive passing of teeth on a rotating member, said apparatus comprising:
   a magnetizable core having an excitation coil;
   means for mounting a magnetic sensor adjacent to the magnetic core;
   means for applying a D.C. voltage to the excitation coil for controlling the rate of change of core permeability with flux density;
   means for applying a fluctuating voltage to the excitation coil for producing changes in the permeability of the core substantially duplicating the mechanically produced magnetic condition resulting from the passage of teeth of a rotating member; and
   means electrically connected to the magnetic sensor for evaluating the response of the sensor.

5. A method of testing the response of a magnetic sensor to repetitive changes in proximity of ferromagnetic material said method comprising the steps of:
   positioning a magnetic sensor adjacent to a magnetizable core having an excitation coil;
   applying a fluctuating voltage to the excitation coil for producing changes in the permeability of the core substantially duplicating the changes which would result from repetitive changes in proximity of ferromagnetic material by applying a D.C. voltage to the excitation coil to magnetize the core such that changes in flux density will produce slow and smooth changes in core permeability and applying an A.C. voltage to the excitation coil for producing changes in the permeability of the core; and
   evaluating the response of the magnetic sensor.

6. The method of claim 5 wherein the magnetic sensor produces an output voltage and the step of evaluating the response of the magnetic sensor comprises the steps of applying load and eddy current loss resistance to the magnetic sensor output voltage equivalent to those of the ferromagnetic material, and measuring a voltage resulting therefrom.

\* \* \* \* \*